(12) United States Patent
Sung et al.

(10) Patent No.: US 8,085,722 B2
(45) Date of Patent: Dec. 27, 2011

(54) RESOURCE ALLOCATION METHOD IN ORTHOGONAL FREQUENCY DIVISION MULTIPLE ACCESS WIRELESS SYSTEMS

(75) Inventors: Dan Keun Sung, Daejeon (KR); Young Ik Seo, Daejeon (KR); Nah Oak Song, Daejeon (KR); Hu Jin, Daejeon (KR); Changgi Cho, Daejeon (KR); Hwang Soo Lee, Gyeonggi-do (KR)

(73) Assignee: Korea Advance Institute of Science and Technology, Daejon (KR)

( * ) Notice: Subject to any disclaimer, the term of this patent is extended or adjusted under 35 U.S.C. 154(b) by 575 days.

(21) Appl. No.: 12/331,632

(22) Filed: Dec. 10, 2008

(65) Prior Publication Data
US 2010/0054198 A1 Mar. 4, 2010

(30) Foreign Application Priority Data
Sep. 2, 2008 (KR) .................. 10-2008-0086159

(51) Int. Cl.
*H04Q 7/00* (2006.01)
*H04J 3/16* (2006.01)

(52) U.S. Cl. ......... 370/329; 370/341; 370/346; 455/450

(58) Field of Classification Search .......... 370/310–346; 709/226; 455/450–513
See application file for complete search history.

(56) References Cited

U.S. PATENT DOCUMENTS

| 7,173,916 B2 * | 2/2007 | Struhsaker et al. ........... 370/329 |
| 7,409,450 B2 * | 8/2008 | Jorgensen ..................... 709/226 |
| 2005/0232193 A1 * | 10/2005 | Jorgensen ..................... 370/329 |
| 2008/0233948 A1 * | 9/2008 | Kazmi et al. .................. 455/423 |
| 2009/0147740 A1 * | 6/2009 | Kim et al. ..................... 370/329 |

FOREIGN PATENT DOCUMENTS
KR 10-2005-0066283 6/2005

OTHER PUBLICATIONS
Office action issued in Korean application No. 10-2008-0086159, dated Jun. 30, 2010.

\* cited by examiner

*Primary Examiner* — Afsar M. Qureshi
(74) *Attorney, Agent, or Firm* — Bacon & Thomas, PLLC

(57) ABSTRACT

A resource allocation method in orthogonal frequency division multiple access wireless systems includes: setting, for each of terminals, data transmission factors including a resource location selection scheme; and determining, for each frame, locations of resources to be allocated to the terminals in a resource allocation order by using the resource location selection schemes. Determining the locations of the resources includes: setting the resource allocation order for the terminals according to priorities of the terminals; selecting resources to be allocated to a terminal by using the resource location selection scheme for the terminal; determining whether all or some of the selected resources have been already allocated to other terminals; and allocating the selected resources to the terminal, if it is determined that the selected resources have not been already allocated to other terminals.

7 Claims, 9 Drawing Sheets

FIG.3

DOWNLINK LOCATION SELECTION REGION $F_N = 3$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 4$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 5$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 6$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 7$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

FIG. 4

DOWNLINK LOCATION
SELECTION REGION $F_N = 3$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 4$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 5$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 6$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 7$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

FIG.5

DOWNLINK LOCATION
SELECTION REGION $F_N = 3$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 4$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 5$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 6$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

$F_N = 7$

| 300 | 304 | 308 | 312 | 316 |
|-----|-----|-----|-----|-----|
| 301 | 305 | 309 | 313 | 317 |
| 302 | 306 | 310 | 314 | 318 |
| 303 | 307 | 311 | 315 | 319 |

RESOURCE ALLOCATION METHOD IN ORTHOGONAL FREQUENCY DIVISION MULTIPLE ACCESS WIRELESS SYSTEMS

FIELD OF THE INVENTION

The present invention relates to a resource allocation method in OFDMA (Orthogonal Frequency Division Multiple Access) wireless systems; and, more particularly, to a resource allocation method in which data transmission factors, including a resource location selection scheme, for each terminal are set in advance and the location of resources to be allocated to each terminal is determined according to the predetermined resource location selection scheme.

BACKGROUND OF THE INVENTION

A representative OFDMA wireless system is the IEEE 802.16d/e system standardized by the IEEE 802.16 standardization group. The IEEE 802.16d/e system employs a wide data transmission bandwidth and adopts an OFDMA scheme which allows users to share resources in an efficient manner. In the IEEE 802.16d/e system, a basestation allocates uplink and downlink resources to terminals wirelessly connected thereto for each frame. Accordingly, the basestation needs to broadcast the location and size of the uplink and downlink resources allocated to each terminal via uplink and downlink maps placed at the head of each downlink subframe.

FIG. 1 illustrates an exemplary frame structure of the IEEE 802.16d/e system. Referring to FIG. 1, a frame is a combination of resources on time and frequency axes. The vertical axis represents the subchannels constituting a system bandwidth, which may be identified by subchannel logical numbers s to s+L, and, the horizontal axis represents the time, which may be identified by OFDMA symbol numbers k to k+46. The frame includes a DL (downlink) subframe and a UL (uplink) subframe. Further, a TTG (transmit/receive transition gap) is inserted after the DL subframe and an RTG (receive/transmit transition gap) is inserted after the UL subframe, thereby preventing interference between uplink and downlink transmissions.

The DL subframe includes a preamble indicating the start of a frame; broadcasting information such as FCH (Frame Control Header), DL-MAP (downlink map) and UL-MAP (uplink map); and DL (downlink) bursts for use in data transmission from a basestation to terminals.

The UL subframe includes control channels such as a ranging channel for use in the bandwidth requests of terminals, an ACK (acknowledgement) channel for informing the basestation whether the terminals correctly receive data and a CQI (Channel Quality Indicator) channel for informing the basestation of channel status of the terminals; and UL (uplink) bursts for use in data transmission from the terminals to the basestation.

The DL-MAP and the UL-MAP in the DL subframe include a DL-MAP_IE (downlink map information element) and a UL-MAP_IE (uplink map information element), respectively. The DL-MAP_IE and the UL_MAP_IE contain therein resource allocation information, i.e., locations and sizes of the bursts, and destination information of the DL and UL bursts, respectively. Hence, each terminal can check whether the DL and UL bursts are allocated to itself by using the DL-MAP_IE and the UL-MAP_IE, and can transmit/receive data via the allocated resource.

As described above, since the resource allocation information is broadcast to all active terminals for each frame, the resources of the IEEE 802.16d/e system can be flexibly allocated according to the amount of data transmitted/received to/from the terminals. However, if the amount of data transmitted/received to/from each terminal is small and thus the data from/to a large number of terminals are multiplexed within one frame, the size of the DL-MAP and UL-MAP containing therein the resource allocation information for a large number of multiplexed terminals becomes larger, which results in excessive overhead in the system. In particular, in case of persistent services with light traffic, e.g., voice call services or video conference services, as the number of terminals connected to a basestation increases, the resource allocation information significantly increases in proportion to the number of the connected terminals, which may significantly degrade the system performance.

SUMMARY OF THE INVENTION

In view of the above, the present invention provides a resource allocation method for efficiently utilizing limited wireless communications resources while minimizing the amount of control information such as uplink and downlink maps.

In accordance with an aspect of the present invention, there is provided a resource allocation method in orthogonal frequency division multiple access wireless systems, the method comprising: setting, for each of terminals, data transmission factors including a resource location selection scheme; and determining, for each frame, locations of resources to be allocated to the terminals in a resource allocation order by using the resource location selection scheme.

Preferably, determining the locations of the resources includes: setting the resource allocation order for the terminals according to priorities of the terminals; selecting resources to be allocated to a terminal by using the resource location selection scheme for the terminal; determining whether all or some of the selected resources have been already allocated to other terminals; and allocating the selected resources to the terminal, if it is determined that the selected resources have not been already allocated to other terminals.

Preferably, the data transmission factors further include a modulation and coding scheme and a size of resource to be allocated.

Preferably, the modulation and coding scheme and the size of resource are determined based on at least one of an average amount of data, a maximum amount of data and channel status of each of the terminals.

Preferably, the resource location selection scheme determines a starting location of the resources to be allocated to each of the terminals by using a random-number generator having parameters of a media access control address of each of the terminals and a frame number of each frame.

Preferably, the resource location selection scheme is applied only to resource allocation of resources located in specific regions.

Preferably, the data transmission factors are set and changed by using DSA (Dynamic Service Addition) and DSC (Dynamic Service Change).

Preferably, the data transmission factors are set and changed by using uplink and downlink map information elements.

According to the present invention, a basestation determines the locations of resources to be allocated to terminals by using a resource location selection scheme set in advance, thus allowing efficient use of limited wireless communications resources while minimizing the amount of control information such as uplink and downlink maps.

BRIEF DESCRIPTION OF THE DRAWINGS

The above features of the present invention will become apparent from the following description of embodiments, given in conjunction with the accompanying drawings, in which:

FIG. 3 illustrates an exemplary resource allocation in the downlink location selection region of FIG. 2;

FIG. 4 illustrates another exemplary resource allocation in the downlink location selection region of FIG. 2;

FIG. 5 illustrates still another exemplary resource allocation in the downlink location selection region of FIG. 2;

DETAILED DESCRIPTION OF THE EMBODIMENTS

Figure 1:
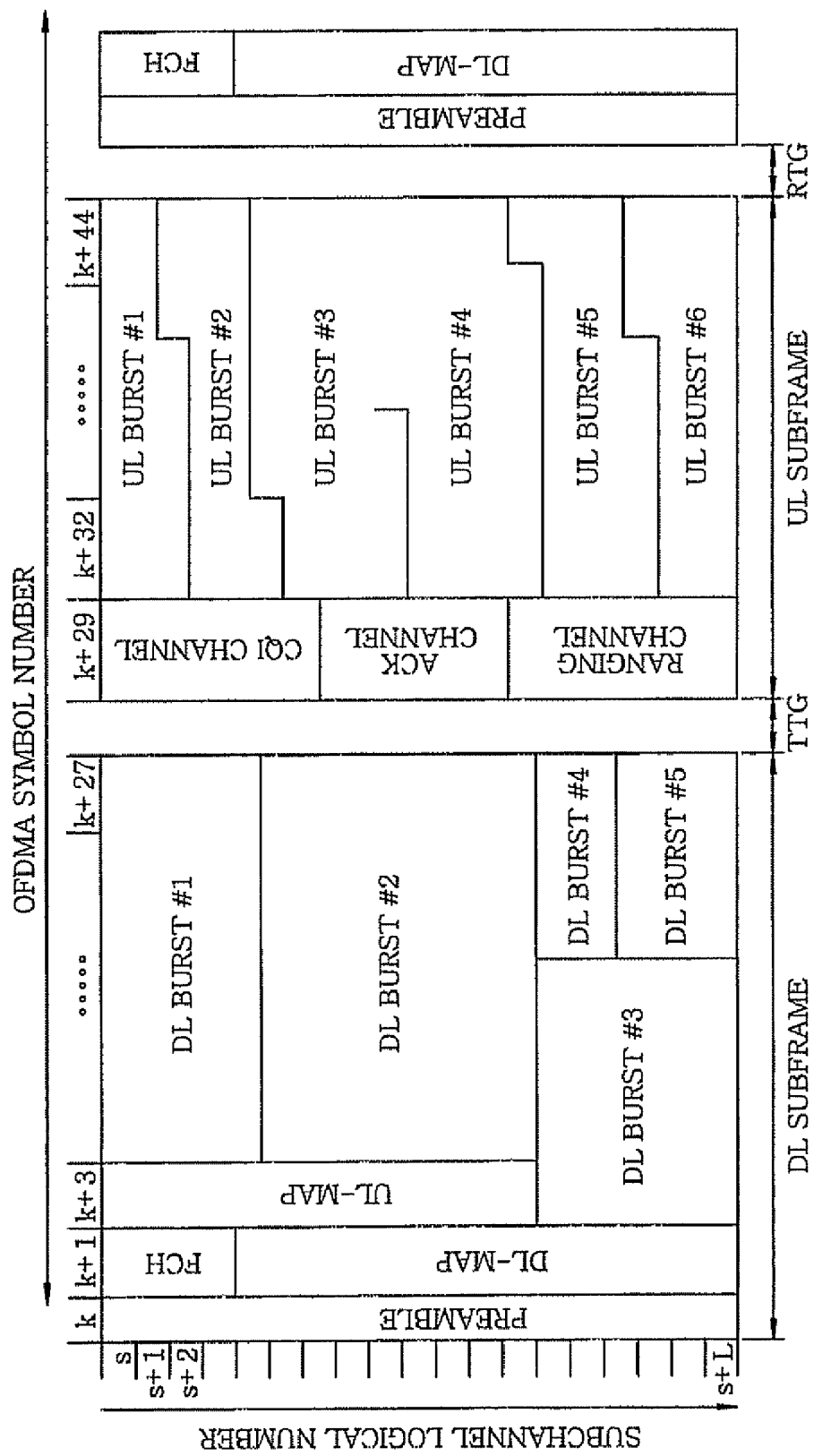
FIG. 1 illustrates an exemplary frame structure of the IEEE 802.16d/e system.

Hereinafter, embodiments of the present invention will be described in detail with reference to the accompanying drawings, which form a part hereof.

In accordance with a resource allocation method of the present invention, each terminal is required to negotiate with a basestation to set in advance the resource location selection scheme, which is for use in determining the locations of resources, i.e., slots, to be allocated to the terminal for each frame, as well as the resource size and a modulation and coding scheme (hereinafter, simply referred to as "MCS"). Such setting may be performed by using DSA (Dynamic Service Addition) at a time when a call is established between the terminal and the basestation or by using UL-MAP_IE and DL-MAP_IE before a start of data transmission therebetween. Further, the MCS, the resource size and the resource location selection scheme may be changed by using DSC (Dynamic Service Change) or the UL-MAP_IE and DL-MAP_IE.

The resource size and the MCS may be set based on the average amount of data to be transmitted or received by each terminal, the maximum amount of data, channel status and the like.

As an example, suppose a VoIP (Voice over Internet Protocol) signal exhibiting talk-spurt and silence periods alternately, wherein a forty-bytes packet is generated every 20 msec (millisecond) during each talk-spurt period and no packets are generated during the silence periods. In the Mobile WiMAX (Worldwide Interoperability for Microwave Access) system, a minimum unit of resource is represented by a slot and forty-eight symbols can be transmitted in each slot. Hence, the amount of data that can be transmitted in one slot is determined according to the MCS, i.e., six, nine and twelve bytes can be transmitted in one slot in case of using QPSK1/2, QPSK3/4 and 16QAM1/2, respectively.

The resource location selection scheme is used by the basestation in selecting the locations of resources to be allocated to terminals and used also by each terminal in checking the locations of resources allocated thereto for each frame. Since the basestation and the terminals use the identical resource location selection scheme set in advance, if the basestation allocates the resources by using the predetermined resource location selection scheme, each terminal can recognize the locations of the resources allocated thereto without receiving separate information on the locations from the basestation, i.e., only by using the predetermined resource location selection scheme.

The locations may be fixed for all frames as in Equation 1, or may be changed (predetermined) for each frame using a random-number generator as in Equations 2 and 3.

$$Q_s(F_N) = K \quad \text{Equation 1}$$

$$Q_s(F_N) = \text{rand}(N_M, F_N) \% \ N_{s,A} \quad \text{Equation 2}$$

$$Q_s(F_N) = N_s \times \text{rand}(N_M, F_N) \% \left\lfloor \frac{N_{s,A}}{N_s} \right\rfloor \quad \text{Equation 3}$$

In Equations 1 to 3, $Q_s(F_N)$ denotes the slot number indicating the starting location of a data burst for a terminal in a frame having a frame number of $F_N$. In Equation 1, K denotes the slot number. In Equations 2 and 3, $N_{s,A}$ and $\text{rand}(N_M, F_N)$ denote the total number of available slots and a random-number generator output having parameters of $N_M$ and $F_N$, respectively, wherein $N_M$ denotes the address, e.g., MAC (Media Access Control) address, of the terminal. In Equation 3, $N_s$ denotes the resource size which is set in advance, and $\lfloor x \rfloor$ denotes the maximum integer smaller than x.

Though Equations 1 to 3 use a slot as a basic unit, the size of the basic unit can be changed to any other extent. Further, each resource location selection scheme can be expressed two-dimensionally, i.e., by two equations for subchannels and symbols, respectively.

In the frame, location selection regions can be set by using the DSA/DSC or the UL-MAP_IE/DL-MAP_IE. In such a case, the resource allocation method according to the present invention is applied only to thus predetermined location selection regions and the remaining resources except the predetermined location selection regions are allocated by using a conventional resource allocation method.

Figure 2:
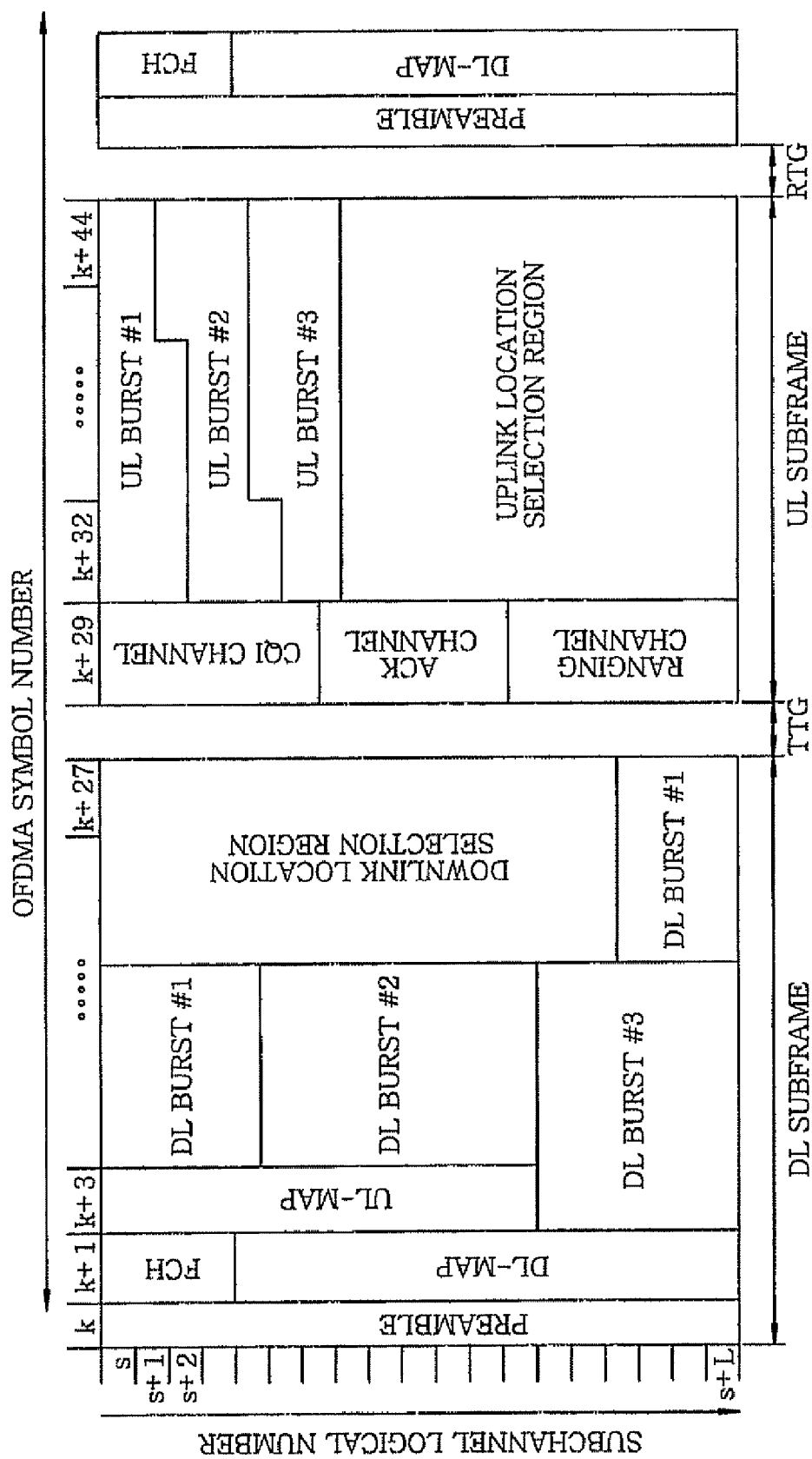
FIG. 2 illustrates an exemplary frame structure having location selection regions to which a resource allocation method according to the present invention is applied.

FIG. 2 illustrates an exemplary frame structure having location selection regions to which a resource allocation method according to the present invention is applied.

In FIG. 2, a downlink location selection region in the DL subframe corresponds to resources for use in downlink transmission to which the resource allocation method according to the present invention is applied, and, an uplink location selection region in the UL subframe corresponds to resources for use in uplink transmission to which the resource allocation method according to the present invention is applied.

Below, only the downlink transmission will be described. However, the same can be applied to the uplink transmission FIG. 3 illustrates an exemplary resource allocation using Equation 1 in the downlink location selection region of FIG. 2.

Since the downlink location selection region has twenty slots 300 to 319 in FIG. 3, K in Equation 1 may be set to be an integer in a range from 0 to 19. If K is set to 5, $Q_s(F_N)$ always becomes 305 irrespective of $F_N$ as shown in FIG. 3. Further, if the size of resource to be allocated to a terminal is set to five slots under the assumption that a VoIP traffic is transmitted using QPSK3/4, the slots 305 to 309 may be allocated to the terminal for all frames.

FIG. 4 illustrates an exemplary resource allocation using Equation 2 in the downlink location selection region of FIG. 2.

Since a downlink location selection region has twenty slots 300 to 319 in FIG. 4, $N_{s,A}$ in Equation 2 becomes 20. As shown in FIG. 4, $Q_s(F_N)$ becomes 308, 301, 313, 307 and 317 when $F_N$ is 3, 4, 5, 6 and 7, respectively. That is, different resources are allocated to the terminal for each frame.

FIG. 5 illustrates an exemplary resource allocation using Equation 3 in the downlink location selection region of FIG. 2.

Since a downlink location selection region has twenty slots 300 to 319 in FIG. 5, $N_{s,A}$ in Equation 3 becomes 20. If $N_s$ in Equation 3 is set to 5 under the assumption that a VoIP traffic is transmitted using QPSK3/4, $Q_s(F_N)$ can have a value of 0, 5, 10 or 15 depending on $F_N$. In FIG. 5 $Q_s(F_N)$ becomes 310, 305, 300, 315 and 305 when $F_N$ is 3, 4, 5, 6 and 7, respectively. Equation 3 allows a terminal to use different resources for each frame like Equation 2, but it can fix the starting location to some specific slot numbers. The resource allocation using Equation 3 shows better characteristics in avoiding resource conflicts, i.e., resource collisions, between terminals than the resource allocation using Equation 2, which will be described later.

Below, how to efficiently use downlink resources allocatable to the terminals according to the above-described resource location selection schemes will be described.

Figure 6:
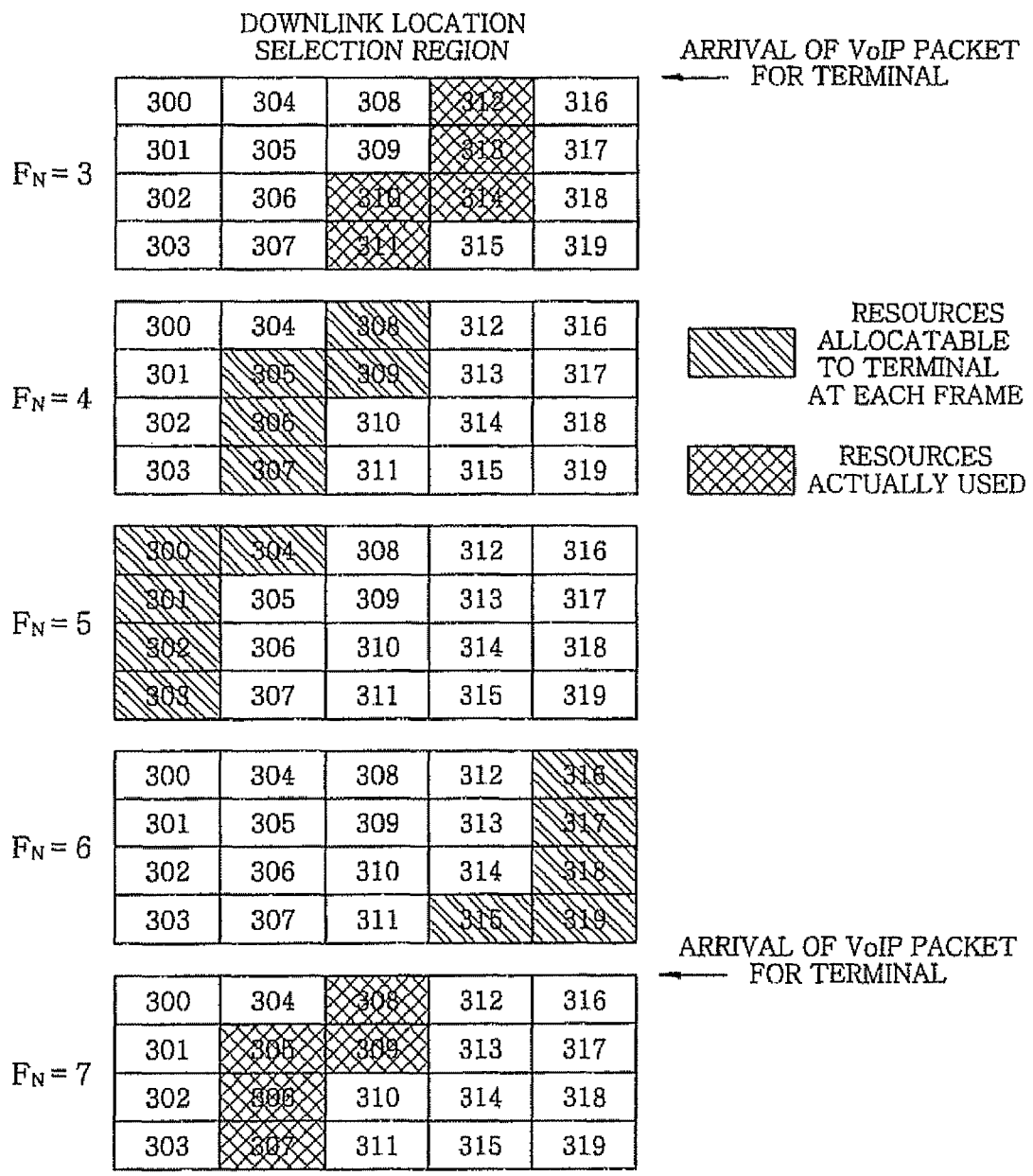
FIG. 6 illustrates an exemplary view of resources allocatable to a terminal according to the resource allocation of FIG. 5 and resources actually used by the terminal.

Some resources can be allocated to a terminal for each frame, but the terminal does not need to use the resources allocated thereto when there is no data to be transmitted. FIG. 6 illustrates an exemplary view of the resources allocatable to a terminal according to the resource allocation of FIG. 5 and the resources actually used by the terminal. As for the VoIP traffic, a packet is generated every 20 msec during a talk-spurt period. Since a typical frame in the mobile WiMAX system has a length of 5 msec, one VoIP packet is generated every four frames. Therefore, among the resources allocatable to the terminal in frames having frame numbers $F_N$ of 3 to 7, the terminal performs VoIP packet transmission by using resources in the frames with frame numbers, $F_N$, 3 and 7 only, as shown in FIG. 6. Accordingly, resources in the frames with frame numbers, $F_N$, 4 to 6 can be used for data transmission of other terminals, instead of being allocated to the terminal.

Meanwhile, if resources in a frame need to be allocated to a plurality of terminals according to the above-described resource location selection schemes, a resource conflict (resource collision), i.e., a situation in which the same resources are selected to be allocated to two or more terminals, can occur.

Figure 7:
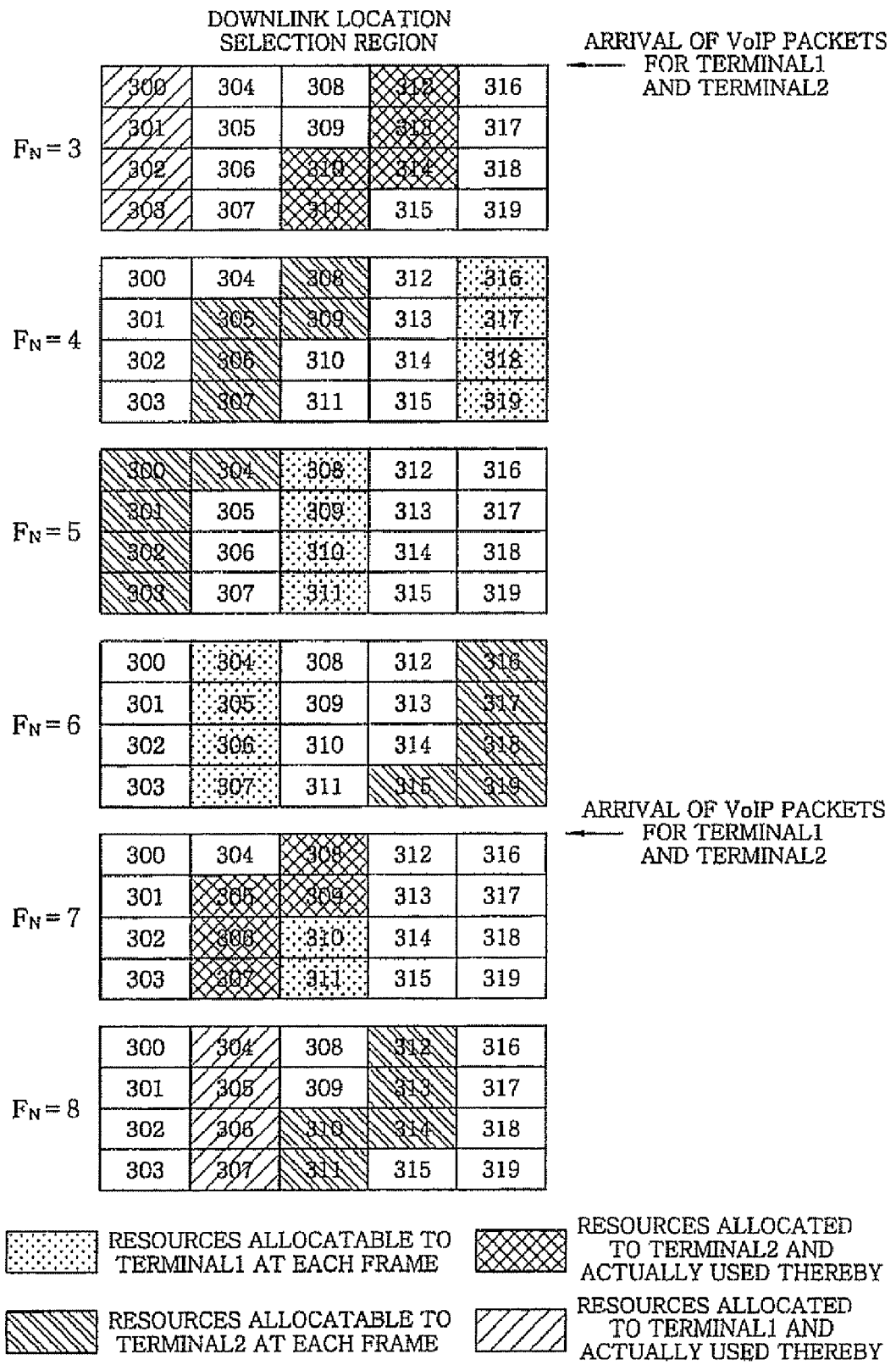
FIG. 7 illustrates an exemplary view of resources allocatable to two terminals according to the resource location selection scheme of the present invention and resources actually used by the terminals.

FIG. 7 illustrates an exemplary view of the resources allocatable to two terminals according to the resource location selection scheme using Equation 3 and the resources actually used by the terminals.

If it is assumed that terminal 1 has good channel status to set the MCS to 16QAM1/2 and terminal 2 has channel status worse than that of the terminal 1 to set the MCS to QPSK3/4, the resource sizes $N_s$ in Equation 3 for the VoIP traffic of the terminals 1 and 2 become four and five slots, respectively. Referring to FIG. 7, slots 300 to 303, 316 to 319, 308 to 311, 304 to 307, 308 to 311 and 304 to 307 may be allocated to the terminal 1 when the frame numbers $F_N$ are 3, 4, 5, 6, 7 and 8, respectively. Further, slots 310 to 314, 305 to 309, 300 to 304, 315 to 319, 305 to 309 and 310 to 314 may be allocated to the terminal 2 when the frame numbers $F_N$ are 3, 4, 5, 6, 7 and 8, respectively.

When the frame number $F_N$ is equal to 3, since both the terminals 1 and 2 have data to receive and different resources are allocated thereto, the terminals 1 and 2 can simultaneously receive the data. That is, packet transmission to the terminal 1 is performed using the slots 300 to 303 selected for the terminal 1 according to the resource location selection scheme of the terminal 1, and packet transmission to the terminal 2 is performed using the slots 310 to 314 selected for the terminal 2 according to the location selection scheme of the terminal 2.

Meanwhile, when the frame number $F_N$ is equal to 7, since both the terminals 1 and 2 have the packets to receive, the basestation selects resources to be allocated to the terminals 1 and 2 by using the resource location selection schemes of the terminals 1 and 2, respectively. That is, the slots 308 to 311 are selected for the terminal 1 and slots 305 to 309 are selected for the terminal 2.

However, since the slot 309 is selected for the terminal 1 and for the terminal 2 simultaneously, a resource conflict (collision) occurs between the terminals 1 and 2. Accordingly, a method for solving the resource conflict is needed, which will be described in detail later. In FIG. 7, the resource conflict is solved by permitting the packet transmission to the terminal 2 while delaying the packet transmission to the terminal 1 in the frame having the frame number $F_N$ of 7, That is, only the packet transmission to the terminal 2 is performed in the frame having a frame number $F_N$ of 7. The packet transmission to the terminal 1 is temporarily suspended and resource acquisition for the suspended packet transmission is attempted again in the next frame. In the frame having a frame number $F_N$ of 8, since the packet is directed only to the terminal 1, the packet transmission to the terminal 1 is performed using the slots 304 to 307 which are selected to be allocated to the terminal 1 according to the resource location selection scheme of the terminal 1.

If the packet transmissions are performed in the above-described manner, each terminal attempts to receive data by checking the locations of resources allocated thereto for each frame according to the resource location selection scheme of the terminal set in advance. The terminal can check whether data transmitted via the frame is directed thereto, based on the identifier contained in the data.

Further, if the packet transmissions are performed in the above-described manner, the base station basestation does not need to transmit the DL-MAP_IE for the downlink transmission. This reduces the size of the DL-MAP and significantly saves the amount of resource for DL-MAP transmission. Therefore, more resources can be used for data transmission, which allows more efficient use of limited wireless communications resources. Further, as shown in FIG. 7, the packet transmission is delayed only if a resource conflict occurs between terminals, and otherwise, the packet transmission is performed without delay. Accordingly, the quality of real-time traffic such as VoIP can be guaranteed.

Figure 8:
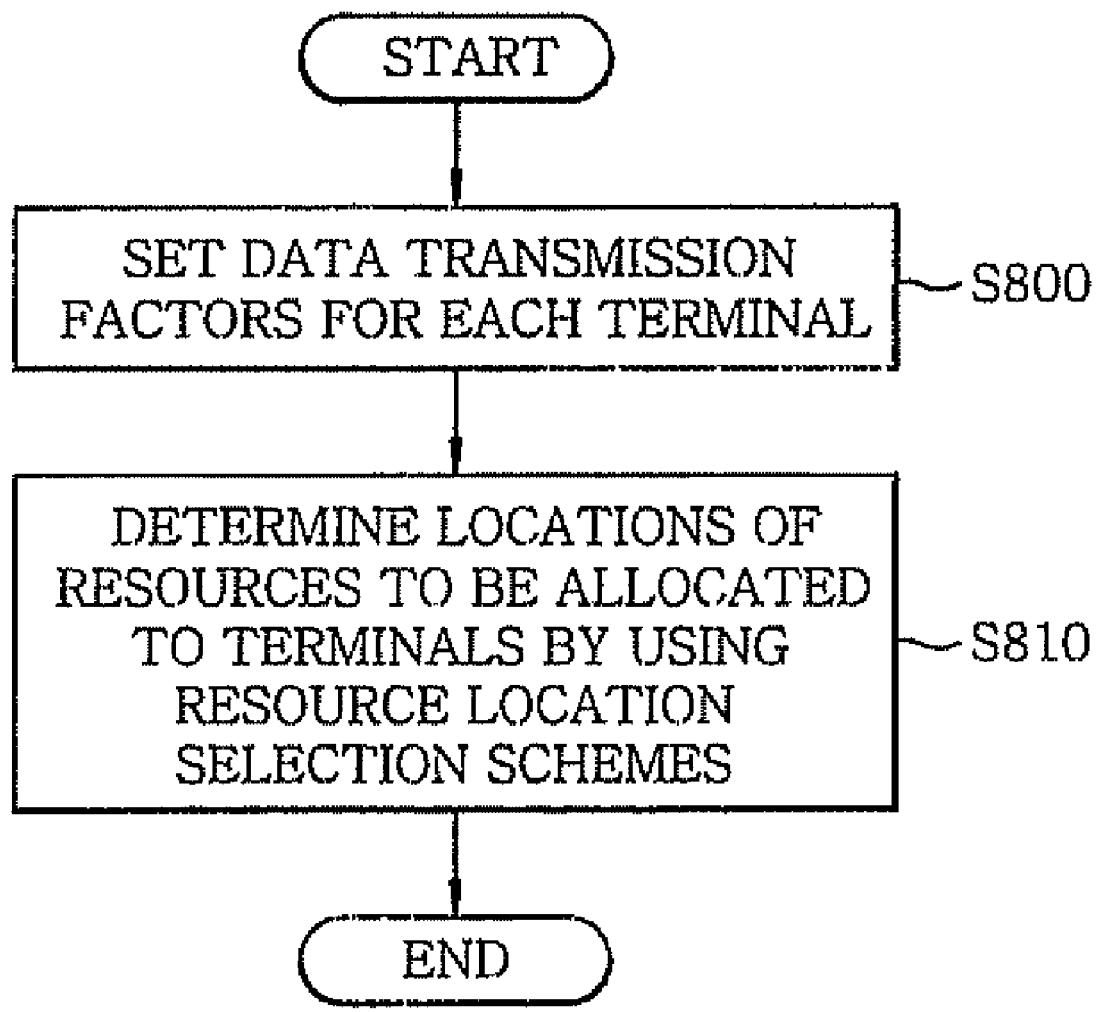
FIG. 8 illustrates a flowchart of a resource allocation method in an OFDMA wireless system in accordance with an embodiment of the present invention.

FIG. 8 illustrates a flowchart of a resource allocation method in OFDMA wireless systems in accordance with an embodiment of the present invention.

Referring to FIG. 8, data transmission factors are set for each terminal (step S800). Here, the data transmission factors include the MCS, the size of resource to be allocated and the resource location selection scheme for determining the locations of the resources to be allocated to each terminal. After that, the locations of the resources to be allocated to terminals are determined by using the predetermined resource location selection schemes (step S810). The step S810 includes the above-described resource conflict resolution and is performed for each frame.

Figure 9:
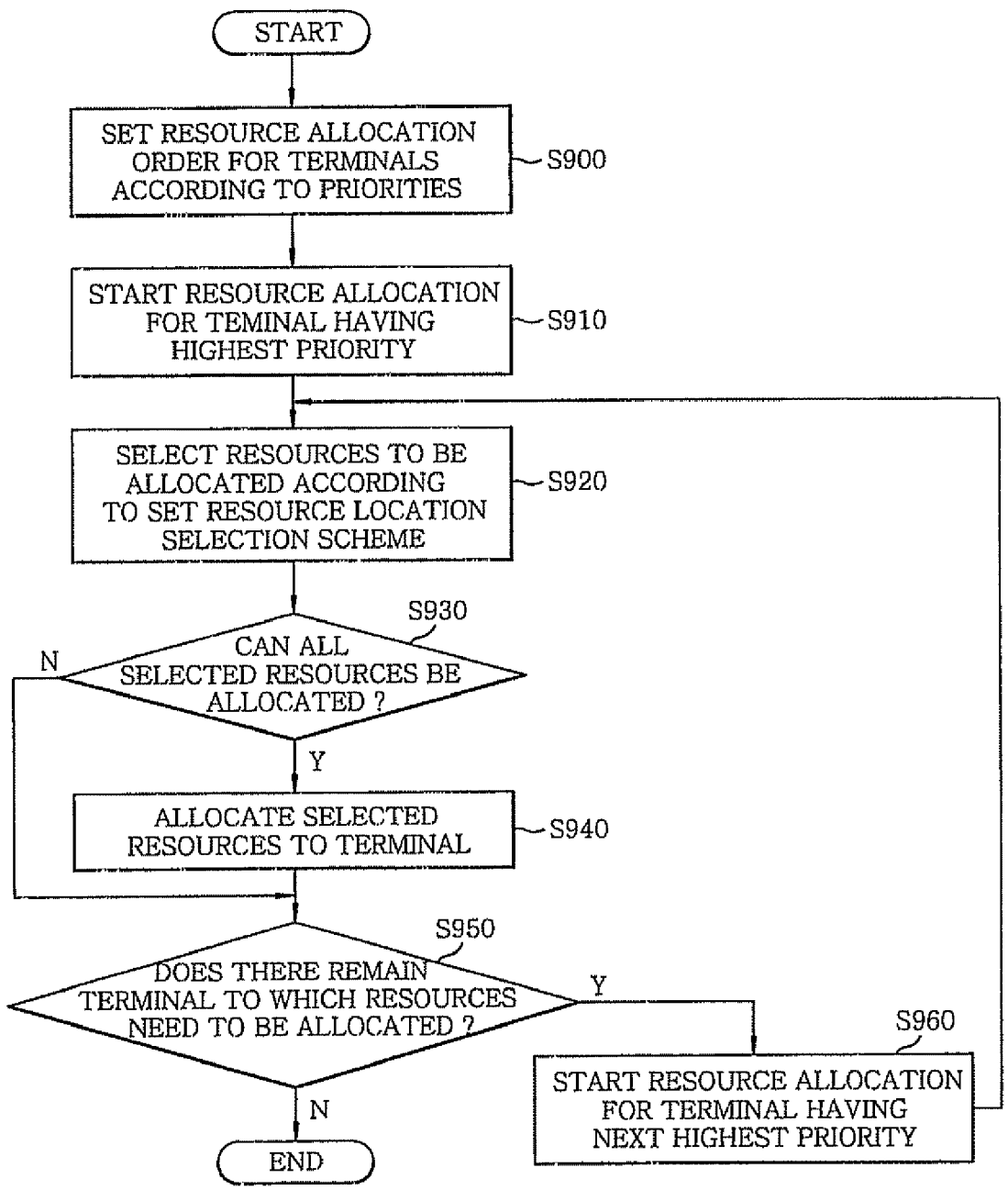
FIG. 9 illustrates a flowchart for describing the method of FIG. 8 in detail.

FIG. 9 illustrates a flowchart for describing the step S810 of FIG. 8 in detail.

Referring to FIG. 9, the basestation sets a resource allocation order for the terminals according to priorities of the terminals (step S900) The priorities may be set according to any of scheduling schemes that have been previously proposed or will be proposed in future. The basestation starts resource allocation according to the resource allocation order set in the step S900, i.e., the basestation starts resource allocation for a terminal having the highest priority (step S910) The basestation selects resources to be allocated to the terminal according to the resource location selection scheme set in advance for the terminal (step S920). The basestation determines whether all the selected resources can be allocated to the terminal (step S930).

If it is determined in the step S930 that all the selected resources are available, the basestation allocates the selected resources to the terminal (step S940) The basestation then determines whether there remain one or more terminals to which resources need to be allocated (step S950) If there remains no terminal to which the resources need to be allocated, the resource allocation procedure ends. On the other hand, if there remain one or more terminals to which the resources need to be allocated, the basestation starts resource allocation for a terminal having the next priority (step S960) Then, the steps S920 to S960 are repeatedly performed.

While the invention has been shown and described with respect to the embodiments, it will be understood by those skilled in the art that various changes and modification may be made without departing from the scope of the invention as defined in the following claims.

What is claimed is:

1. A resource allocation method in orthogonal frequency division multiple access wireless systems, the method comprising:

setting, for each of terminals, data transmission factors including a resource location selection scheme;

determining, for each frame, locations of resources to be allocated to the terminals in a resource allocation order by using the resource location selection scheme; and wherein the resource location selection scheme determines a starting location of the resources to be allocated to each of the terminals by using a random-number generator having parameters of a media access control address of each of the terminals and a frame number of each frame.

2. The method of claim 1, wherein determining the locations of the resources includes:

setting the resource allocation order for the terminals according to priorities of the terminals;

selecting resources to be allocated to a terminal by using the resource location selection scheme for the terminal;

determining whether all or some of the selected resources have been already allocated to other terminals; and allocating the selected resources to the terminal, if it is determined that the selected resources have not been already allocated to other terminals.

3. The method of claim 1, wherein the data transmission factors further include a modulation and coding scheme and a size of resource to be allocated.

4. The method of claim 3, wherein the modulation and coding scheme and the size of resource are determined based on at least one of an average amount of data, a maximum amount of data and channel status of each of the terminals.

5. The method of claim 1, wherein the resource location selection scheme is applied only to resource allocation of resources located in specific regions.

6. The method of claim 1, wherein the data transmission factors are set and changed by using DSA (Dynamic Service Addition) and DSC (Dynamic Service Change).

7. The method of claim 1, wherein the data transmission factors are set and changed by using uplink and downlink map information elements.

* * * * *